United States Patent
Cathcart et al.

(10) Patent No.: US 9,787,620 B2
(45) Date of Patent: *Oct. 10, 2017

(54) FACILITATING GENERATION OF USER CONTENT FOR AGGREGATED STORY UNITS

(71) Applicant: Facebook, Inc., Menlo Park, CA (US)

(72) Inventors: Robert William Cathcart, San Francisco, CA (US); Mark Tonkelowitz, Mountain View, CA (US); Xiao Ou Wang, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/276,031

(22) Filed: Sep. 26, 2016

(65) Prior Publication Data

US 2017/0012914 A1    Jan. 12, 2017

Related U.S. Application Data

(63) Continuation of application No. 15/063,862, filed on Mar. 8, 2016, now Pat. No. 9,479,347, which is a
(Continued)

(51) Int. Cl.
*G06F 15/16* (2006.01)
*H04L 12/58* (2006.01)
(Continued)

(52) U.S. Cl.
CPC ............. *H04L 51/16* (2013.01); *G06Q 10/10* (2013.01); *G06Q 50/01* (2013.01);
(Continued)

(58) Field of Classification Search
CPC ..... H04L 51/16; H04L 51/32; H04L 12/1831; H04L 67/22; G06Q 50/01; G06Q 10/10
See application file for complete search history.

(56) References Cited

U.S. PATENT DOCUMENTS

2008/0040474 A1* 2/2008 Zuckerberg ............ G06Q 30/02
709/224
2008/0040475 A1* 2/2008 Bosworth .............. G06Q 30/08
709/224
(Continued)

OTHER PUBLICATIONS

U.S. Office Action, U.S. Appl. No. 13/759,873, dated Jun. 19, 2015, fifteen pages.
(Continued)

*Primary Examiner* — Gregory Todd
*Assistant Examiner* — Tania Pena-Santana
(74) *Attorney, Agent, or Firm* — Fenwick & West LLP

(57) ABSTRACT

A social networking system aggregates two or more stories having at least one common characteristic to create an aggregated story unit. Each story describes an action performed on an object over the social networking system or external to the social networking system. The aggregated story unit includes one or more input elements allowing a viewing user to interact with the aggregate story unit as a whole or with individual stories in the aggregated story unit. The input elements included in the aggregated story unit may be based on the types of the actions or of the objects described by stories in the aggregated story unit and on one or more input policies.

20 Claims, 3 Drawing Sheets

Related U.S. Application Data continuation of application No. 13/759,873, filed on Feb. 5, 2013, now Pat. No. 9,319,472.

(51) Int. Cl.
*H04L 12/18* (2006.01)
*G06Q 50/00* (2012.01)
*G06Q 10/10* (2012.01)
*H04L 29/08* (2006.01)

(52) U.S. Cl.
CPC .......... *H04L 12/1831* (2013.01); *H04L 51/32* (2013.01); *H04L 67/22* (2013.01)

(56) References Cited

U.S. PATENT DOCUMENTS

| | | | |
|---|---|---|---|
| 2009/0144392 A1* | 6/2009 | Wang | G06Q 10/10 709/217 |
| 2011/0004831 A1* | 1/2011 | Steinberg | H04N 21/454 715/753 |
| 2011/0154223 A1 | 6/2011 | Whitnah et al. | |
| 2012/0166530 A1* | 6/2012 | Tseng | G06Q 30/0255 709/204 |
| 2013/0332523 A1* | 12/2013 | Luu | G06Q 30/0251 709/204 |
| 2014/0149215 A1* | 5/2014 | Rajaram | G06F 17/30616 705/14.54 |

OTHER PUBLICATIONS

U.S. Office Action, U.S. Appl. No. 13/759,873, dated Nov. 20, 2014, thirteen pages.

U.S. Office Action, U.S. Appl. No. 15/063,862, dated May 4, 2016, eleven pages.

* cited by examiner

FACILITATING GENERATION OF USER CONTENT FOR AGGREGATED STORY UNITS

CROSS REFERENCE TO RELATED APPLICATIONS

This application is a continuation of U.S. patent application Ser. No. 15/063,862, filed Mar. 8, 2016, which is a continuation of U.S. patent application Ser. No. 13/759,873, filed Feb. 5, 2013, both of which are incorporated herein by reference in their entirety.

BACKGROUND

This invention generally relates to social networking systems, and more specifically to generating user content for aggregated story units.

Social networking systems have become prevalent in recent years and allow users to connect and communicate with other users. Frequently, social networking systems provide information to a user describing actions performed by other users to which the user is connected. For example, a social networking system may automatically provide a user with a story indicating that another user connected to the user has read a particular news article, or played a particular video game. The user receiving the story may comment on the story, express a preference for the story, share the story with additional users, or perform other interactions with the story.

A social networking system may group similar stories together to provide information to users more efficiently. However, current social networking systems do not enable users to comment on, indicate a preference for, or otherwise generate content based on a group of similar stories as a whole or based on individual stories in a group in an intelligent manner.

SUMMARY

A social networking system facilitates generation of user content for aggregated story units. As used herein, a "story" is a content item provided to a particular user of a social networking system (a "viewing user") describing an action performed on an object by an additional user of the social networking system connected to the particular user. An aggregated story unit is a grouping of stories having one or more similar characteristics that may be presented together to a viewing user. In one embodiment, the social networking system includes one or more input elements when presenting aggregated story units. In some instances a viewing user can interact with the input elements to generate content associated with the aggregated story unit in its entirety. For example, a viewing user may share an aggregated story unit with another user, express a preference for the aggregated story unit (i.e., "like" the aggregated story unit), provide a comment for the aggregated story unit, or provide any other type of interaction with the aggregated story unit. Based on one or more input selection policies, interactions received via the input elements may be associated with the aggregated story unit as a whole or to individual stories included in the aggregated story unit.

In one embodiment, the social networking system obtains interaction data describing one or more actions performed on one or more objects by additional users connected to a viewing user. Based on the interaction data, the social networking system generates stories describing the actions and determines similarities of the actions and/or objects described by the stories. Based at least in part on the similarities of the actions and/or objects described by the stories, the social networking system aggregates at least two of the stories into an aggregated story unit. Based on types for the actions and/or objects described in the stories, the social networking system determines whether to provide input elements for the aggregated story unit as a whole or to provide separate input elements for individual stories in the aggregated story unit. The determination may additionally or alternatively be based on one or more input selection policies generated based on A-B testing, social signals, instructions received from external systems, or other suitable information.

After generation, the aggregated story unit is presented to the viewing user. By interacting with one or more input elements presented along with the aggregated story unit, the viewing user generates content (e.g., comments, "likes," etc.). Based on the prior determination when providing input elements, the content generated by the viewing user is associated with the aggregated story unit or with individual stories comprising the aggregated story unit. Content generated by the viewing user's interactions with the input elements is communicated to additional users connected to the viewing user along with either the associated aggregated story unit or an individual story from the aggregated story unit.

Hence, the social networking system allows users to easily generate content associated with multiple stories by interacting with a presented aggregated story unit. This encourages social networking system users to communicate and/or share collections of similar stories. Increasing communication of similar stories may result in more organized and efficient communication of information using the social networking system.

The features and advantages described in this summary and the following detailed description are not all-inclusive. Many additional features and advantages will be apparent to one of ordinary skill in the art in view of the drawings, specification, and claims hereof.

Figure 1:
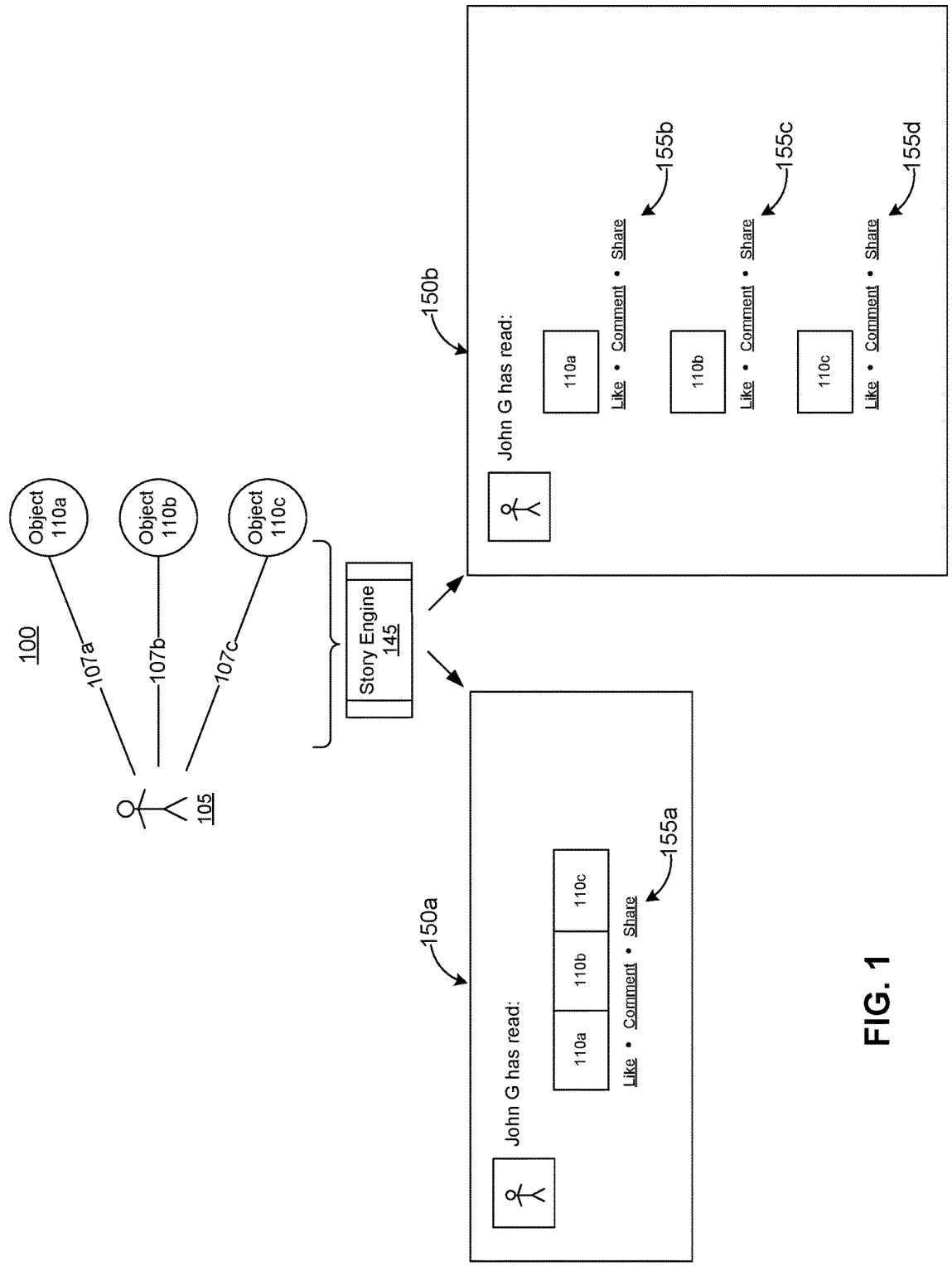
FIG. 1 is a block diagram of a process for generating user content for aggregated story units, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows its users to communicate and interact with other users. In use, a user registers for an account to join the social networking system. The social networking system may thereafter reliably identify the user based on the user account.

The social networking system stores information related to each user as part of a user profile. Examples of information stored by a user profile include: a user's demographics, including gender, age, geographical region, stated interests or preferences, professional, personal, or educational affiliations, income, or any other suitable information about the user. The user profile may also be associated with historical information describing the activities of the user internal to and/or external to the social networking system. For example, the user profile is associated with information regarding a user visiting various pages maintained by the social networking system, searching for pages maintained by the social networking system, indicating a preference for a page maintained by the social networking system ("liking" the page), becoming a fan of a page maintained by the social networking system, sharing a page maintained by the social networking system, accessing an advertisement, commenting on an advertisement, sharing an advertisement, joining a group, attending an event, checking-in to a location, buying products, or other actions.

The user profile may also include and/or be associated with information indicating connections between the user and additional users of the social networking system (e.g., friends, family members). For example, a user accepts requests from other users of the social networking system to establish a connection with the user. After the user accepts the requests, the social networking system stores information identifying the other users connected to the user.

In one embodiment, a social networking system presents one or more stories to its users. The stories may be presented via pages, user profiles, a newsfeeds, streams of data, or any other suitable communication channel. A story is a communication to a user ("a viewing user") describing an action performed on an object by an additional user connected to the viewing user. For example, if a viewing user is connected to another user who has "liked" a company's page, a story may be provided to the viewing user indicating that the additional user has "liked" the company's page. An action described by a story presented to the viewing user may be performed internal to the social networking system or external to the social networking system. The social networking system may aggregate or group similar stories to generate an aggregated story unit. In one embodiment, the aggregated story unit includes one or more input elements for receiving content from the viewing user with respect to the aggregated story unit or with respect to an individual story included in the aggregated story unit.

Referring to FIG. 1, a block diagram of one embodiment for generating user content for aggregated story units in a social networking system 100 is shown. In the example of FIG. 1, a user 105 performs three separate actions 107*a*, 107*b*, 107*c* on various objects 110*a*, 110*b*, 110*c*. For purposes of illustration, the actions 107*a*, 107*b*, 107*c* and/or the objects 110*a*, 110*b*, 110*c* have common characteristics, similar characteristics, or are otherwise similar. Information describing the actions 107*a*, 107*b*, 107*c* and identifying the objects 110*a*, 110*b*, 110*c* is received by a story engine 145 of the social networking system 100. Based on the received information, the story engine 145 generates an aggregated story unit 150 including three stories describing the three separate actions 107*a*, 107*b*, 107*c* performed by the user 105 on the objects 110*a*, 110*b*, 110*c*. The story engine 145 also determines whether to include input elements in the aggregated story unit 150 that are applicable to the aggregated story unit itself or to include input elements that are applicable to individual stories in the aggregated story unit 150. Various information, such as types for the actions and/or objects associated with the stories in the aggregated story unit, A-B testing results, and social signals may be used to determine whether input elements apply to the aggregated story unit 150 or to the individual stories in the aggregated story unit 150.

FIG. 1 shows different types of aggregated story units 150*a* and 150*b* generated based on whether input elements of an aggregated story unit are to be applied to the aggregated story unit as a whole or to each individual story. As shown in FIG. 1, the story unit 150*a* includes an input element 155*a* allowing a viewing user to interact with the aggregated story unit 150*a* in its entirety. For example, the input element 155*a* allows a viewing user to share the aggregated story unit 150*a*. In contrast, the story unit 150*b* includes the input elements 155*b*, 155*c*, and 155*d*, which each separately applies to a corresponding story of the aggregated story unit 150*b*. Hence, interactions with an individual input element 155*b*, 155*c*, or 155*d* is associated with an individual story from the aggregated story unit 150*b*.

System Architecture

Figure 2A:
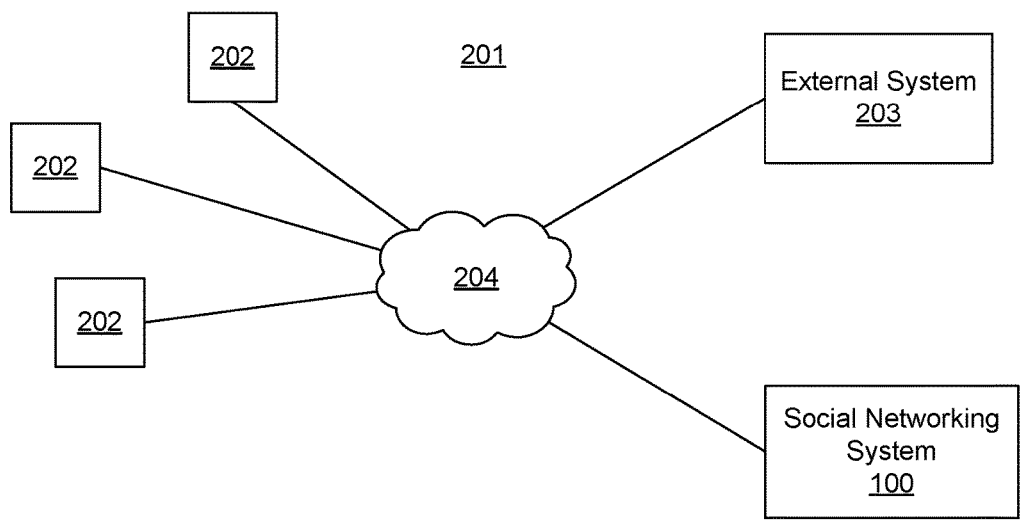
FIG. 2A is a block diagram of a system environment suitable for operation of a social networking system, in accordance with an embodiment of the invention.

FIG. 2A is a block diagram illustrating one embodiment of a system environment 201 including a social networking system 100. As shown in FIG. 2A, the system environment 201 includes one or more client devices 202, one or more external systems 203, the social networking system 100, and a network 204. While FIG. 2A shows three client devices 202 and one external system 203, it should be appreciated that any number of these entities (including millions) can be included. In alternative configurations, different entities can also be included in the system environment 201.

A client device 202 is a computing device capable of receiving user input, as well as transmitting and/or receiving data via the network 204. Examples of client devices 202 include desktop computers, laptop computers, tablet computers (pads), mobile phones, personal digital assistants (PDAs), gaming devices, or any other device including computing functionality and data communication capabilities. Hence, the client devices 202 enable users to access the functionalities of the social networking system 100. The client devices 202 also allow various users to communicate with one another via the social networking system 100.

The network 204 may be any wired or wireless local area network (LAN) and/or wide area network (WAN), such as an intranet, an extranet, or the Internet. The network 204 provides communication capabilities between one or more client devices 202, one or more external systems 203, and the social networking system 100. In various embodiments the network 204 may use standard communication technologies and/or protocols. Examples of technologies used by the network 204 include Ethernet, 802.11, 3G, 4G, 802.16, or any other suitable communication technology. Examples of protocols that may be used by the network 204 include transmission control protocol/Internet protocol (TCP/IP), hypertext transport protocol (HTTP), simple mail transfer protocol (SMTP), file transfer protocol (TCP), or any other suitable communication protocol.

The external system 203 is coupled to the network 204 to communicate with the social networking system 100 and/or with one or more client devices 202. The external system 203 provides content (e.g., content of objects) to one or more client devices 202 and/or to the social networking system 100. Examples of content provided by the external system 202 include web pages, news articles, multimedia content, audio data, or other data. Interactions by users of the social networking system 100 with content provided by an external system 203 may be captured and provided to the social networking system 100 through a social plug-in or other communication channel between the external system 203 and the social networking system 100. The social networking system users may apply one or more privacy settings to regulate or limit the actions on the external system 203 communicated to the social networking system 100. In one embodiment, actions captured by the external system 203 and/or objects provided by the external system 203 with which the user may interact are defined by the external system 203 and provided to the social networking system 100.

Figure 2B:
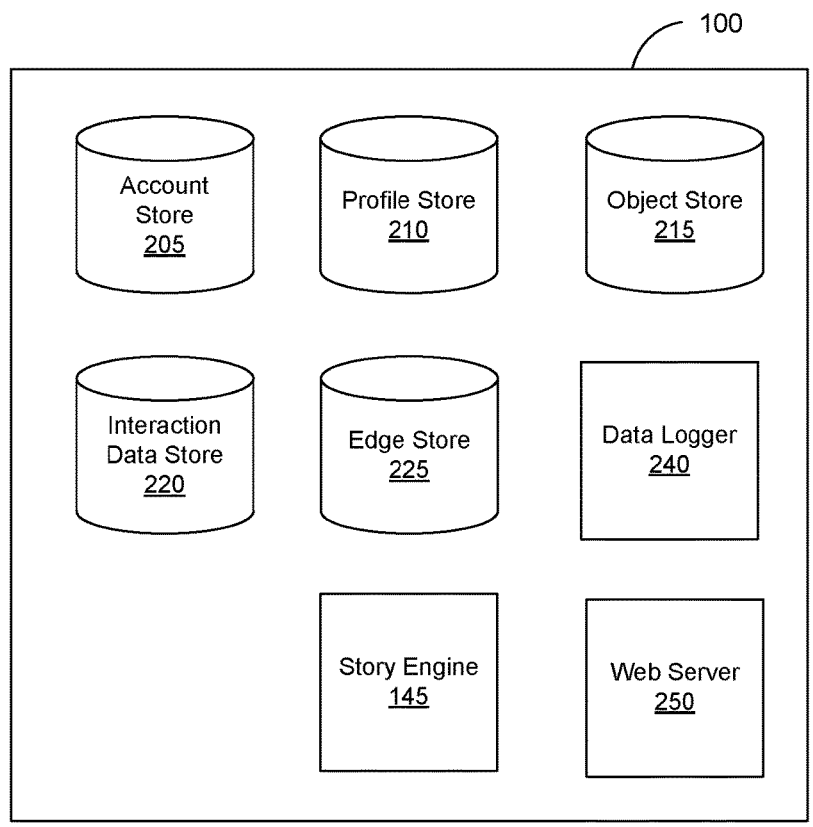
FIG. 2B is a block diagram of a social networking system, in accordance with an embodiment of the invention.

The social networking system 100, further described below in conjunction with FIG. 2B, is a computing system allowing its users to communicate or otherwise interact with each other and access content as described herein. In one embodiment, the social networking system 100 stores user accounts describing its users. User profiles are associated with user accounts and include information describing users. Examples of information included in a user profile include biographic, demographic, and other types of descriptive information, such as work experience, educational history, hobbies or preferences, location, and the like. Using information in the user profiles, connections between user profiles, and actions associated with the user profiles, the social networking system 100 maintains a social graph of nodes interconnected by edges. Each node in the social graph represents an object that may act on and/or be acted upon by another object. Examples of objects represented by nodes include users, non-person entities, content items, groups, events, locations, messages, concepts, and any other suitable information. An edge between two nodes in the social graph represents a particular kind of connection between the two nodes resulting from an action that was performed by an object represented by a node on another object represented by the other node.

FIG. 2B is a block diagram of one embodiment of the social networking system 100. In the embodiment shown by FIG. 2B, the social networking system 100 includes an account store 205, a profile store 210, an object store 215, an interaction data store 220, an edge store 225, a data logger 240, a web server 250 and the story engine 145. In alternative configurations, different and/or additional components can be included in the social networking system 100.

The account store 205 stores information describing a user account associated with each social networking system user. The information describing a user account may include a user identifier, a username, a user password, one or more user settings (e.g., user privacy settings), identifiers of client devices 202 associated with a user, or other suitable information. Data included in the account store 205 may be encrypted or otherwise secured to prevent unauthorized access to the data Each user account is associated with a corresponding user profile, which is stored in the profile store 210. A user profile includes declarative information about the user that was explicitly shared by the user and may also include profile information inferred by the social networking system 100. In one embodiment, a user profile includes multiple data fields, with each data field describing one or more attributes of the corresponding user of the social networking system 100. The information in a user profile describes a user corresponding to the user profile. Examples of information in a user profile include biographic information, demographic information, and other types of descriptive information, such as work experience, educational history, gender, hobbies or preferences, location and the like. A user profile in the profile store 210 may also maintain references to actions by a user on objects and/or connections to other users.

While user profiles in the profile store 210 are frequently associated with individuals, allowing users to interact with each other via the social networking system 100, user profiles may also be stored for entities such as businesses or organizations. This allows an entity to establish a presence on the social networking system 100 for connecting and exchanging content with other social networking system users. The entity may post information about itself, about its products or provide other information to users of the social networking system 100 using a brand page associated with the entity's user profile. Other users of the social networking 100 system may connect to the brand page to receive information posted to the brand page or to receive information from the brand page. A user profile associated with the brand page may include information about the entity itself, providing users with background or informational data about the entity.

The object store 215 stores objects describing content associated with the social networking system 100. Objects stored in the object store 215 may include various types of content, such as pages (e.g., fan pages or brand pages), events, groups, applications, general postings or comments, brand objects, entities, abstract ideas, articles, etc. Additional types of content described by an object include text, images, videos, audio files, software applications, metadata, etc. For example, an object may be a fan page for a particular television set manufacturer.

In one embodiment, types for the objects and/or any actions associated with the types objects may be defined by the social networking system 100 and/or by the external systems 203. For example, an external system 203 may define types of objects, and types of actions that may be performed on the objects. For example, a third-party website may define a news article type object. The third-party web site may further indicate that users can perform "read" type actions on the object. As another example, a third party website may define a video type object. The third-party website may further indicate that users can perform "watch" or "view" type actions on the object. Additional details regarding the definition of objects and/or actions by an external system 203 are described in U.S. patent application Ser. No. 13/239,340, filed on Sep. 21, 2011, titled "Structured Objects and Actions on a Social Networking System," which is hereby incorporated by reference in its entirety.

The object store 215 may store each object as a suitable structure including data describing the object. Example data describing an object includes: identifiers for the object, identifiers for a user account that owns or administers the object, content (e.g., text, images, links, etc.) associated with the object, information indicating whether the object is a child or parent (or neither), identification information for the parent or children of the object (if required), classification information for the object (e.g., a category to which the subject matter of the object relates, such as coffee, electronics, etc.), type information for the object (e.g., group type, event type, fan page type, article type, etc.), types of actions that may be performed on the object, and/or any other suitable information.

The interaction data store 220 tracks and stores user actions performed over the social networking system 100, as well as over external websites that communicate information to the social networking system 100, such as the external system 203. Users may interact with various objects on the social networking system 100, including commenting on posts, sharing links, and checking-in to physical locations via a mobile device, accessing content items in a sequence or other interactions. Additional examples of interactions with objects on the social networking system 100 stored in the interaction data store 220 include commenting on a photo album, communicating messages between users, becoming a fan of a musician, adding an event to a calendar, joining a group, becoming a fan of a fan page, creating an event, authorizing an application, using an application and engaging in a transaction. Additionally, the interaction data store 220 stores user interactions with advertisements on the social networking system 100 as well as other applications operating on the social networking system 100. In some embodiments, data from the interaction data store 220 is used to infer interests or preferences of the user, augmenting the interests included in the user profile and allowing a more complete understanding of user preferences.

The interaction data store 220 may also store user actions performed on objects over the external systems 203. For example, the interaction data store 220 may store information regarding a user that has "read" a news article served by a third party website. As another example, the interaction data store 220 may store information regarding a user that has "listened" to a song provided by a music streaming service.

The edge store 225 stores information describing connections between users and other users and/or objects in the social networking system 100. Data describing these connections are stored as edges in the edge store 225. Some edges may define explicit associations, such as connections between users and other user or between users and objects. For example, a user may establish a fan type connection or relationship with a brand page of a particular brand, and the connection is recorded as an edge stored in the edge store 225. Other edges may define implicit associations between users and other users or objects. For example, a user may "like" a comment posted by an entity on a brand page of the entity, which is recorded as an edge stored in the edge store 225. Multiple connections between a user and a specific object may be recorded in a single edge stored in the edge store 225; alternatively, each connection is stored as a separate edge.

Additional data describing edges may be stored in the edge store 225, such as an affinity score. An affinity score of an edge may be computed by the social networking system 100 over time to approximate a user's affinity for a particular object or other social networking system user. Computation of the affinity score may be based on the interactions performed by the user and/or number of associations between the user and an object or other user. In one aspect, the more positive interactions a user performs with an object, the greater the affinity score associated with the edge between the object and the user. Computation of affinity is further described in U.S. patent application Ser. No. 12/978,265, filed on Dec. 23, 2010, which is hereby incorporated by reference in its entirety.

The data logger 240 receives information about user interactions on and/or off the social networking system 100, and populates the interaction data store 220 with information describing the user interactions. Such interactions may include, for example, adding a connection to another user, sending a message to another user, uploading an image, reading a message from another user, viewing content associated with another user, attending an event, or other suitable actions between a user and an object or another user. Interactions between a social networking system user and objects within the social networking system 100 identified by the data logger 240 are stored in the interaction data store 220. Additionally, the data logger 240 may store and/or update edges in the edge store 225 based on user interactions.

The web server 250 links the social networking system 100 via the network 204 to one or more of the client devices 202, as well as to one or more external systems 203. The web server 250 may include a mail server or other messaging functionality for receiving and routing messages between the social networking system 100 and the client devices 202 or external systems 203. The messages may be instant messages, queued messages (e.g., email), text and short message service (SMS) messages, or any other suitable messaging technique. In one embodiment, the web server 250 receives user requests for content and sends a request for stories to present to a user to the story engine 145.

The story engine 145 retrieves data from the edge store 225 and from the interaction data store 220 to generate stories for presentation to a viewing user based on interactions with objects by users connected to the viewing user. As described above, a story describes an action performed on an object by a user connected to a viewing user. The story engine 145 also generates aggregated story units including multiple stories describing similar actions and/or objects.

To allow users to easily interact with an aggregated story unit, the story engine 145 includes one or more input elements associated with the aggregated story unit. Based on the types of actions and/or objects described by the stories in an aggregated story unit, the story engine 145 determines whether to provide an input element associated with the aggregated story unit as a whole or to provide separate input elements applying to individual stories in the aggregated story unit. Through interacting with an input element, a viewing user may accordingly interact with the aggregated story unit or with constituent stories of the aggregated story unit. These interactions allow the social networking system 100 to generate content (e.g., comments, "likes," etc.) based on the aggregated story unit. Aggregation of stories and generation of content from aggregated story units are further described below in conjunction with FIG. 3.

Generating Content for Aggregated Story Units

Figure 3:
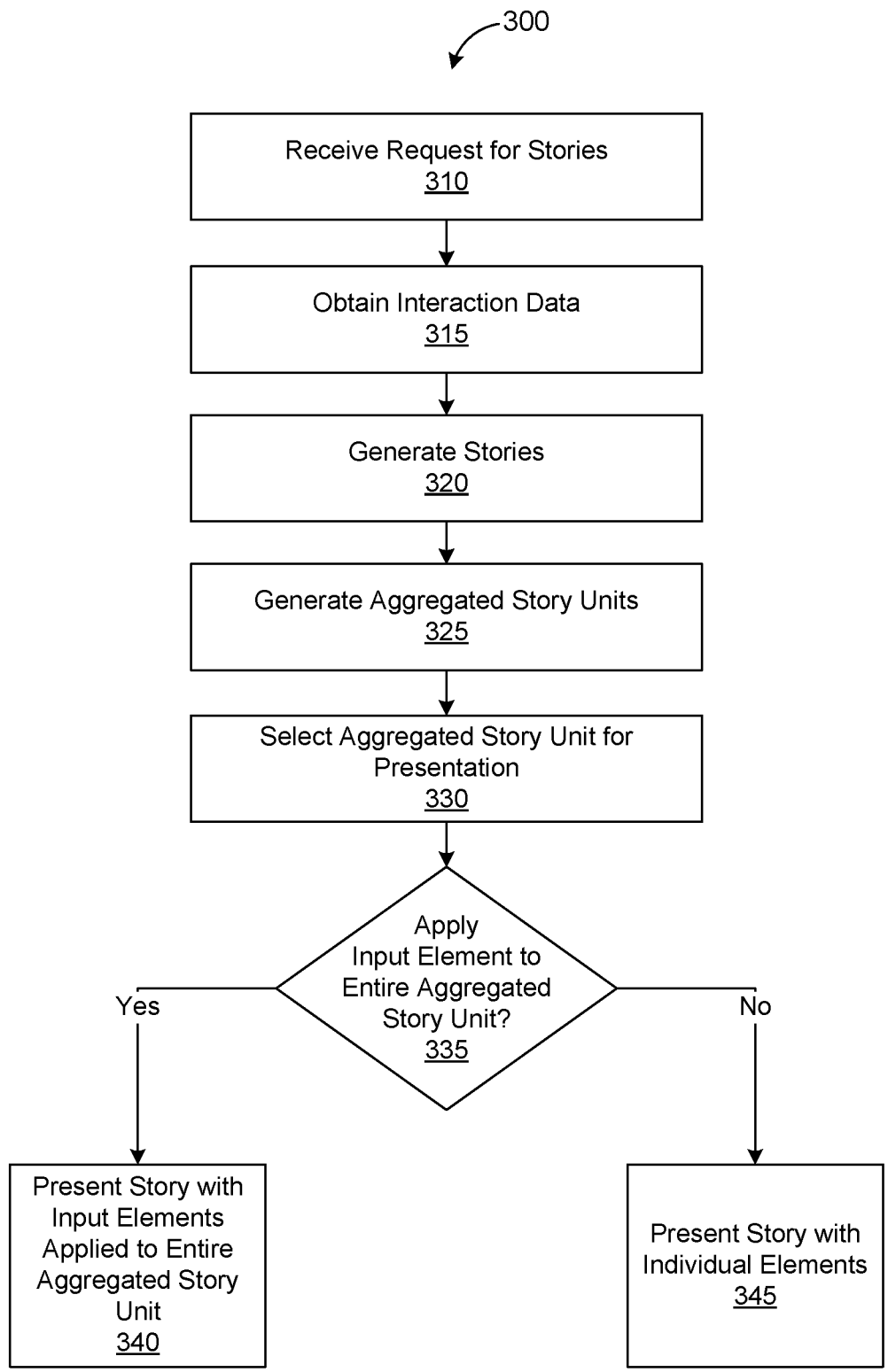
FIG. 3 is a flow chart of a process for generating user content for aggregated story units, in accordance with an embodiment of the invention.

FIG. 3 illustrates a flow chart of one embodiment of a process 300 for generating user content for aggregated story units. Other embodiments may perform the steps of the process 300 in different orders and can include different, additional and/or fewer steps. The process 300 may be performed by any suitable entity, such as the story engine 145.

The story engine 145 receives 310 a request for one or more stories from a client device 202 of a viewing user. The request may be received 310 when the viewing user accesses the social networking system 100 via the client device 202 or when the viewing user requests content provided by the social networking system, such as a newsfeed associated with the viewing user, a user profile of the viewing user, or any other content provided by the social networking system 100. Based on the request, the story engine 145 identifies users connected to the requesting user from the edge store 225 and obtains 315 interaction data for the users connected to the viewing user from the interaction data store 220.

The obtained interaction data indicates one or more actions performed by the users connected to the viewing user on objects associated with the social networking system 100. For example, the interaction data may indicate that an additional user connected to the viewing user has expressed a preference for ("liked") a particular fan page provided by the social networking system 100. As another example, the interaction data indicates that an additional user connected to the viewing user has shared an advertisement with another social networking system user.

The interaction data may additionally or alternatively include information indicating one or more actions performed by users connected to the viewing user over one or more external systems 203. For example, the interaction data indicates that a user connected to the viewing user has read a news article provided by a third-party website. As another example, the interaction data indicates that a user connected to the viewing user has listened to a song streamed by an online music service.

Based on the interaction data, the story engine 145 generates 320 one or more stories each describing an action performed by an additional user connected to the viewing user on an object. For example, the story engine 145 generates 320 a story indicating that a user connected to the viewing user has purchased a particular product from an online retailer's website. As another example, the story engine 145 generates 320 another story indicating that a user connected to the viewing user has watched a video from an online video service.

From the generated the stories, the story engine 145 generates 325 one or more aggregated story units including two or more stories having one or more common characteristics. In one embodiment, the story engine 145 aggregates stories associated with a common user or with a common object. For example, the story engine 145 aggregates multiple stories involving the same news article into an aggregated story unit. As another example, the story engine 145 aggregates stories identifying the same user as viewing different video clips from an online streaming service. In other embodiments, the story engine 145 aggregates multiple stories associated with objects having similar topics or subjects, aggregates multiple stories associated with a common object type or action type, or aggregates multiple stories having any suitable common characteristic. For example, the story engine 145 aggregates stories discussing the same news event, or aggregates stories associated with users that have each "liked" various objects.

In one implementation, the number of stories comprising an aggregated story unit is based on types of the objects and/or actions associated with the stories included in the aggregated story unit. For example, an aggregated story unit may include a maximum of five stories describing "read" type actions. As another example, an aggregated story unit may include a maximum of twenty stories describing actions performed on a particular video clip object.

One or more of the aggregated story units are selected 330 for presentation to the viewing user using any suitable criteria. In one embodiment, the story engine 145 selects 330 an aggregated story unit based on user engagement values for the stories included in the aggregated story unit. An aggregated story unit having a highest overall user engagement value may be selected 330 from the generated aggregated story units. The overall user engagement value for a story unit may be measured in any suitable manner. For example, the overall user engagement value may be based on the number of users that have viewed the stories comprising the aggregated story unit, so an aggregated story unit has an overall user engagement score proportional to the total number of users viewing the stories comprising the aggregated story unit. As another example, the overall user engagement value is based on the user-perceived quality of the stories comprising the aggregated story unit. Hence, an aggregated story unit has an overall user engagement value proportional to the number of users expressing a preference for stories comprising the aggregated story unit.

Alternatively, the story engine 145 selects 330 the one or more aggregated story units based on affinities between the viewing user and the users associated with the stories included in the aggregated story units. Hence, an aggregated story unit including stories associated with users for which the viewing user has a highest overall affinity is selected 330. The affinities between a viewing user and users associated with stories in the aggregated story unit may be measured in any suitable manner. For example, the number of interactions between the viewing user and each of the users associated with the stories in an aggregated story unit can affect the affinities between the viewing user and each of the users associated with the stories.

Content of the stories included in an aggregated story unit may be used to select 330 one or more aggregated story units. In one embodiment, the story engine 145 identifies matches between text in the stories of the aggregated story units and text in the user profile of the viewing user. For example, the stories in an aggregated story unit may each reference a particular company's product that is also referenced in the viewing user's user profile. Hence, the story engine 145 selects the aggregated story unit. In another embodiment, the story engine 145 matches a concept or subject associated with the stories in an aggregated story unit with a concept or subject in the viewing user's user profile. For example, the stories of an aggregated story unit may each reference a particular company's product while the viewing user's user profile identifies a different product having the same product category. Because both the stories in the aggregated story unit and the viewing user's user profile reference products of the same product category, the aggregated story unit is selected 330.

The methods for selecting an aggregated story unit may be combined in any suitable manner. For example, the story engine 145 may consider both user engagement values and affinities associated with aggregated story units. In such an embodiment, the story engine 145 may differently weight the selection criteria.

One or more input elements are included in the selected aggregated story unit. As used herein, an "input element" is any suitable mechanism for receiving an input from the viewing user. Examples of an input element include: a text field, a set of radio buttons, a set of checkboxes, a dropdown menu, a button or set of buttons, a link or set of links, etc. For example, the input element is a set of buttons or links for providing user comments, liking a story or aggregated story unit, sharing a story or aggregated story unit, or performing any other suitable interaction.

When including the one or more input elements in an aggregated story unit, the story engine 145 determines 335 whether the input elements apply to the aggregated story unit as a whole (i.e., aggregated input elements) or apply to individual stories comprising the aggregated story unit. If an input element applies to the aggregated story unit as a whole, an interaction with the input element performed by the viewing user applies to the entirety of the aggregated story unit; hence, subsequent communications to additional users identifying the interaction reference and/or include the entirety of the aggregated story unit. In contrast, if input elements apply to individual stories of the aggregated story unit, an interaction with a particular input element performed by the viewing user applies to the story with which the particular input element corresponds. Thus, subsequent communications to additional users describing the interaction with the particular input element reference and/or include the story corresponding to the particular input element rather than the entirety of the aggregated story unit.

To determine 335 the manner in which input elements are to be applied in an aggregated story unit, the story engine 145 identifies the objects types and/or action types associated with the stories included in the selected aggregated story unit. For example, the story engine 145 identifies that each object in the aggregated story unit involves a news article type object or that each action in the aggregated story unit is a read type action. Based on the object types and/or action types, the story engine 145 applies one or more input selection policies to determine the manner in which the input elements are to be applied.

In one aspect, the input selection policies map types of objects or types of actions to aggregate input elements or individual input elements. For example, an input selection policy indicates that aggregated story units including stories associated with "news article" type objects include input elements applied to each individual story. As another example, an input selection policy indicates that aggregated story units including stories associated with "answer a question" type actions include input elements applied to the entirety of the aggregated story unit.

In one embodiment, the story engine 145 receives one or more input selection policies from a third party and/or external system 203 associated with one or more stories comprising the selected aggregated story unit. For example, an input selection policy may be received from an online video service indicating that aggregated story units including stories associated with "view" type actions on the objects associated with the service include input elements applying to the aggregated story unit as a whole.

Alternatively, one or more input selection policies are derived via A-B testing performed by the social networking system 100. For specific types of actions and/or types of objects, the story engine 145 presents aggregate story units having input elements that are applied differently to different users. For example, a first set of users is provided an aggregated story unit having stories associated with a particular type of action or type of object, where the input elements of the aggregated story unit are applied to the aggregated story unit as a whole. A second set of users is provided an aggregated story unit having stories associated with the particular type of action or type of object, where with input elements of the aggregated story unit are applied to individual stories in the aggregated story unit. A number or a percentage of users interacting with the input elements of the presented aggregated story units is calculated. If the number or percentage of users in the first set interacting with the input elements is greater than the number or percentage of users in the second set interacting with the input elements, the story engine 145 generates an input selection policy indicating that aggregated story units including stories describing the type of action or the type of object are to be presented with input elements applying to the entirety of the aggregated story unit. Conversely, the story engine 145 generates an input selection policy indicating that aggregated story units including stories describing the type of action or the type of object are to be presented with input elements associated with individual stories in the aggregated story unit if the number or percentage of users in the second set interacting with the input elements is greater. In one implementation, the numbers and/or percentages may be normalized to reflect differences in the number of input elements associated with the aggregated story units.

Alternatively, one or more input selection policies may be based on various social signals of the social networking system 100. As used herein, a social signal is any information that can be derived from user profiles, user connections, and/or user actions associated with the social networking system 100. For example, the story engine 145 may determine that the viewing user and/or the viewing user's friends have historically more frequently interacted with aggregated story units that include input elements applied to the entirety of the aggregated story unit. Thus, an input selection policy may be generated indicating that aggregated story units presented to the viewing user include input elements that apply to the entirety of the aggregated story unit.

If it is determined 335 that the input elements are to apply to the aggregated story unit as a whole, the story engine 145 presents 340 the aggregated story unit with one or more input elements applying to the entirety of the aggregated story unit. When presenting 340 the aggregated story unit, the story engine 145 may format or structure the aggregated story unit to visually indicate that the one or more input elements apply to the aggregated story unit as a whole. For example, the aggregated story unit is formatted to include one input element for each of a set of types of input. As a specific example, the presented 340 aggregated story unit includes a single comment button, a single like button, and a single share button. By interacting with one or more of the input elements, the viewing user generates an interaction associated with the aggregated story unit as a whole.

If it is determined 335 that input elements are to be associated with individual stories within the aggregated story unit, the story engine 145 presents 345 the aggregated story unit with one or more input elements associated with each of the individual stories. When presenting the aggregated story unit, the story engine 145 may format or structure the aggregated story unit to visually indicate that the one or more input elements are applicable to individual stories in the aggregated story unit. For example, the aggregated story unit is formatted to include a set of input elements presented proximate to each constituent story. As a specific example, the aggregated story unit includes a comment button, a like button, and a share button presented proximate to each story. Hence, by interacting with an input element, the viewing user generates an interaction associated with an individual story in the aggregated story unit corresponding to the input element receiving the interaction.

In one embodiment, after providing the aggregated story unit to the viewing user, the story engine 145 receives interactions from the viewing user via one or more input elements of the aggregated story unit. A subsequent story describing the viewing user's interaction is generated and communicated to one or more users connected to the viewing user. Depending on whether the one or more input elements of the aggregated story unit were associated with the aggregated story unit as a whole or with an individual story in the aggregated story unit, the subsequent story either identifies the aggregated story unit as a whole or the individual story, respectively.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving a request from a viewing user for stories;
   generating an aggregated story unit from interaction data obtained from the request, the aggregated story unit including a plurality of stories associated with at least one common characteristic;
   determining, based on an input selection policy, whether to include in the aggregated story unit:
     an input element associated with all of the plurality of stories included in the aggregated story unit as a whole, or
     a plurality of input elements, each of the plurality of input elements associated with an individual story included in the aggregated story unit;
     wherein the input selection policy maps types of objects associated with a communication network system or types of actions performed by one or more users on the objects to the input element or the plurality of input elements, and
   providing, for display to the viewing user, the aggregated story unit with one or more input elements based on the determining.

2. The computer-implemented method of claim 1, wherein the common characteristic is selected from a group consisting of: an object type, an action type, a user, and any combination thereof.

3. The computer-implemented method of claim 1, further comprising:
   receiving an interaction from the viewing user via the input element associated with all of the plurality of stories included in the aggregated story unit as a whole; and
   generating a story describing the interaction by the viewing user with the input element, the generated story identifying the aggregated story unit as a whole.

4. The computer-implemented method of claim 1, further comprising:
   receiving an interaction from the viewing user via a particular input element of the plurality of input elements associated with an individual story included in the aggregated story unit;
   generating a story describing the interaction by the viewing user with the individual story included in the aggregated story unit, wherein the generated story identifies the individual story interacted by the viewing user; and
   providing the generated story to one or more users connected to the viewing user.

5. The computer-implemented method of claim 1, wherein the input selection policy is based at least in part on one or more social signals including information derived from user profiles, user connections and user actions.

6. The computer-implemented method of claim 1, wherein generating the aggregated story unit comprises:
   determining a number of stories included in the aggregated story unit based at least in part on the common characteristic of the stories.

7. The computer-implemented method of claim 1, wherein the input selection policy is from a third party system or external system associated with the aggregated story unit or the input selection policy is derived from A-B testing.

8. The computer-implemented method of claim 1, further comprising:
   selecting one or more aggregated story units for presentation to the viewing user based on at least one of selection criteria and differently weighted two or more selection criteria.

9. The computer-implemented method of claim 8, wherein the selection criteria comprise at least one of:
   an overall user engagement value associated with each aggregated story unit, a user engagement value associated with an aggregated story unit being proportional to the number of users expressing a preference for stories included in the aggregated story unit;
   affinities between the viewing user and the users associated with the stories included in each aggregated story unit, the affinities between the viewing user and the users associated with the stories included in an aggregated story unit being measured by the number of interactions between the viewing user and each of the users associated with the stories included in the aggregated story unit;

content of the stories included in the aggregated story units; and any combination thereof.

10. The computer-implemented method of claim 9, wherein selecting one or more aggregated story units based on content of the stories included in the aggregated story units comprises:

identifying matches between a concept or subject associated with the stories of the aggregated story units and a concept or subject in user profile of the viewing user; and selecting an aggregated story unit based on the identified matches.

11. A non-transitory computer-readable storage medium storing executable computer program instructions, the computer program instructions comprising instructions for:

receiving a request from a viewing user for stories;

generating an aggregated story unit from interaction data obtained from the request, the aggregated story unit including a plurality of stories associated with at least one common characteristic;

determining, based on an input selection policy, whether to include in the aggregated story unit:

an input element associated with all of the plurality of stories included in the aggregated story unit as a whole, or a plurality of input elements, each of the plurality of input elements associated with an individual story included in the aggregated story unit;

wherein the input selection policy maps types of objects associated with a communication network system or types of actions performed by one or more users on the objects to the input element or the plurality of input elements, and providing, for display to the viewing user, the aggregated story unit with one or more input elements based on the determining.

12. The computer-readable storage medium of claim 11, wherein the common characteristic is selected from a group consisting of: an object type, an action type, a user, and any combination thereof.

13. The computer-readable storage medium of claim 11, further comprising computer program instructions for:

receiving an interaction from the viewing user via the input element associated with all of the plurality of stories included in the aggregated story unit as a whole; and generating a story describing the interaction by the viewing user with the input element, the generated story identifying the aggregated story unit as a whole.

14. The computer-readable storage medium of claim 11, further comprising computer program instructions for:

receiving an interaction from the viewing user via a particular input element of the plurality of input elements associated with an individual story included in the aggregated story unit;

generating a story describing the interaction by the viewing user with the individual story included in the aggregated story unit, wherein the generated story identifies the individual story interacted by the viewing user; and providing the generated story to one or more users connected to the viewing user.

15. The computer-readable storage medium of claim 11, wherein the input selection policy is based at least in part on one or more social signals including information derived from user profiles, user connections and user actions.

16. The computer-readable storage medium of claim 11, wherein generating the aggregated story unit comprises:

determining a number of stories included in the aggregated story unit based at least in part on the common characteristic of the stories.

17. The computer-readable storage medium of claim 11, wherein the input selection policy is from a third party system or external system associated with the aggregated story unit or the input selection policy is derived from A-B testing.

18. The computer-readable storage medium of claim 11, further comprising computer program instructions for:

selecting one or more aggregated story units for presentation to the viewing user based on at least one of selection criteria and differently weighted two or more selection criteria.

19. The computer-readable storage medium of claim 18, wherein the selection criteria comprise at least one of:

an overall user engagement value associated with each aggregated story unit, a user engagement value associated with an aggregated story unit being proportional to the number of users expressing a preference for stories included in the aggregated story unit;

affinities between the viewing user and the users associated with the stories included in each aggregated story unit, the affinities between the viewing user and the users associated with the stories included in an aggregated story unit being measured by the number of interactions between the viewing user and each of the users associated with the stories included in the aggregated story unit;

content of the stories included in the aggregated story units; and any combination thereof.

20. The computer-readable storage medium of claim 19, wherein selecting one or more aggregated story units based on content of the stories included in the aggregated story units comprises:

identifying matches between a concept or subject associated with the stories of the aggregated story units and a concept or subject in user profile of the viewing user; and selecting an aggregated story unit based on the identified matches.

* * * * *